(12) United States Patent
Yu (10) Patent No.: US 6,271,862 B1
(45) Date of Patent: Aug. 7, 2001

(54) APPARATUS AND METHOD FOR DETERMINING LINE CLIPPING INTERSECTION POINTS

(75) Inventor: Cindy Z. Yu, Delta (CA)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/167,840

(22) Filed: Oct. 7, 1998

(51) Int. Cl.[7] .................................................. G06T 15/30
(52) U.S. Cl. .......................... 345/434; 345/435; 345/443; 345/113
(58) Field of Search ................................... 345/434, 433, 345/443, 45, 435, 421, 439, 127, 472, 113, 114, 118, 115; 382/178, 302, 305

(56) References Cited

U.S. PATENT DOCUMENTS

| | | | |
|---|---|---|---|
| 4,623,880 | * 11/1986 | Bresenham et al. | 345/434 |
| 4,982,345 | 1/1991 | Callahan et al. | |
| 5,012,433 | * 4/1991 | Callahan et al. | 345/45 |
| 5,161,212 | 11/1992 | Littleton . | |
| 5,359,347 | 10/1994 | Kim et al. . | |
| 5,369,741 | * 11/1994 | Hartog et al. | 345/443 |
| 5,455,897 | 10/1995 | Nicholl et al. . | |
| 5,491,494 | 2/1996 | Cornett et al. . | |
| 5,522,020 | * 5/1996 | Narayanaswami | 345/433 |
| 5,553,210 | 9/1996 | Narayanaswami . | |
| 5,559,532 | 9/1996 | Gardyne . | |
| 5,594,848 | 1/1997 | Dao . | |
| 5,598,183 | 1/1997 | Robertson et al. . | |
| 5,668,571 | 9/1997 | Pai et al. . | |
| 5,720,019 | * 2/1998 | Koss et al. | 345/434 |
| 5,745,099 | 4/1998 | Blomqvist . | |
| 6,012,072 | 1/2000 | Lucas et al. . | |

OTHER PUBLICATIONS

Addison–Wesley, "*Programmer's Guide to the EGA, VGA and Super VGA Cards*", 3rd Edition, 1994, pp. 153, 154, 554–557 and 732–733, Richard F. Ferraro.

Victor J. Duvanenko, W.E. Robbins, and Ronald S. Gyurcsik, "Improving Line segment clipping", Dr. Dobb's Journal, Jul. 1990, p. 36.*

* cited by examiner

Primary Examiner—Matthew Luu
Assistant Examiner—Thu-Thao Havan (57) ABSTRACT

In a graphics system, an apparatus and method reduce the computational complexity for clipping in a graphics environment by determining the relationship between a line and a graphics element, and performing an optimized number of calculations based on the determined relationship. More specifically, it is first determined whether a clipping operation must be performed at all. This is done by forming a rectangle using the line as a diagonal and comparing that rectangle to the graphics element area to determine overlap. If there is no overlap, no clipping needs to be performed. If there is overlap, the overlapping area is determined and categorized, and a corresponding clipping operation is then performed.

24 Claims, 12 Drawing Sheets

APPARATUS AND METHOD FOR DETERMINING LINE CLIPPING INTERSECTION POINTS

I. BACKGROUND OF THE INVENTION

A. Field of the Invention

The present invention relates generally to clipping in a graphics system and in particular to an apparatus and method for determining line clipping intersection points.

B. Description of the Related Art

In certain computer graphics systems, the portion of a line extending beyond the display area must be clipped. For example, a computer graphics system may perform line clipping to determine which pixels are to be drawn in a window in a computer screen. Line clipping thus determines which lines to draw in the display window, and which portion of a line is to draw if the line is located partially within the display window. In conventional systems, line clipping and line drawing are low-level graphics operations, but calculations involved in clipping lines are complex and time-consuming.

For example, one conventional clipping technique compares each point of a line to the four sides of a display window before drawing the line. This seemingly simple technique requires four comparisons for every point on the line. If the line is much larger than the window, this technique can be extremely time-consuming.

Several conventional line clipping techniques determine the intersection points of a line and the display window. One technique involves intersecting a line with each of the four edges of a clipping rectangle to determine the intersection points on those edges. These, too, can involve a great deal of calculations. Other conventional line clipping techniques, such as the Cohen-Sutherland line clipping algorithm, the Cyrus-Beck technique, and a method of clipping a line by solving linear equations, require extensive multiplication and division operations and are therefore computation intensive and time-consuming. For example, an integer division instruction may take as many as 40 CPU cycles, and one integer multiplication instructions may take as many as 10 cycles on an Intel PENTIUM CPU. Furthermore, some of these techniques require floating point multiplication or division, which require even more computing resources.

II. SUMMARY OF THE INVENTION

Apparatus consistent with this invention for clipping a graphics element comprises means for comparing a graphics element with a graphics area to determine whether the graphics element and the graphics area overlap; means for determining the need for a clipping operation according to the determination whether the graphics element and graphics area overlap; means for categorizing the overlap between the graphics element and the graphics area if there is a need for clipping; and means for clipping the graphics element based on the categorization of the overlap.

The clipping technique consistent with the present invention uses add, subtract and compare operations, each of which only requires a single cycle on an Intel PENTIUM CPU

III. BRIEF DESCRIPTION OF THE DRAWINGS

The accompanying drawings, which are incorporated in and constitute a part of this specification, illustrate an embodiment of the invention and together with the description, serve to explain the principles of the invention.

IV. DETAILED DESCRIPTION OF THE PREFERRED EMBODIMENTS

Reference will now be made in detail to systems and methods consistent with the claimed invention that are illustrated in the accompanying drawings. Wherever possible, the same reference numbers will be used throughout the drawings to refer to the same or like parts.

Figure 1:
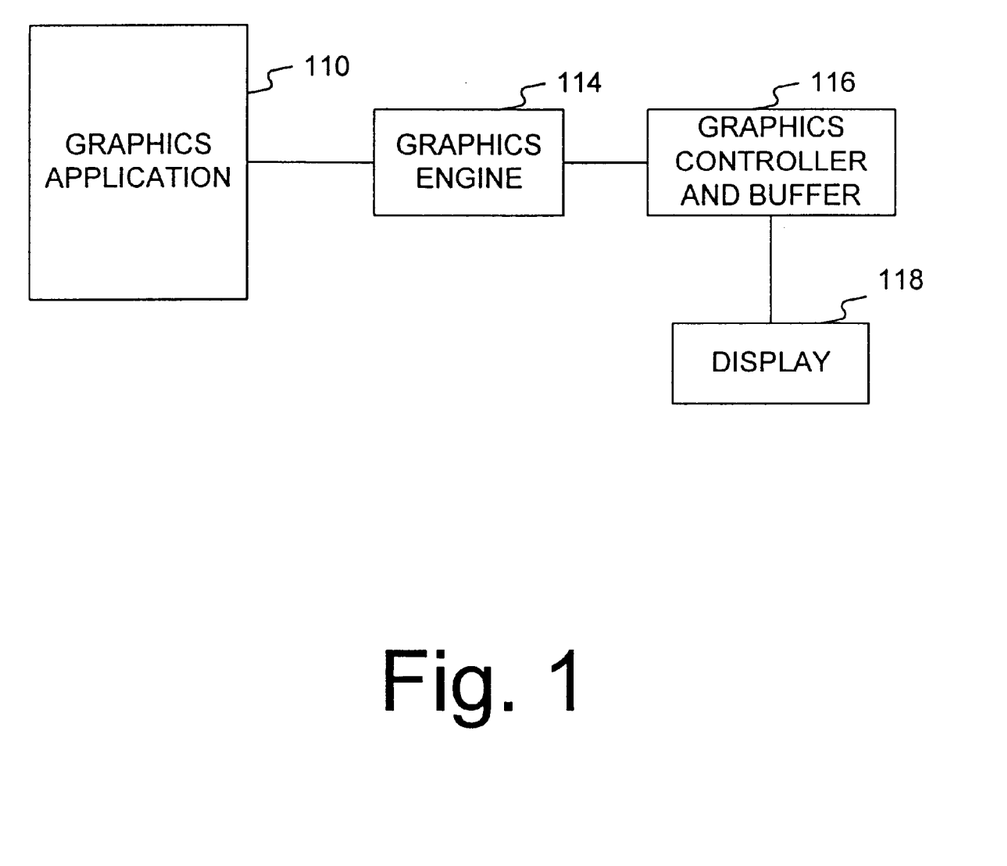
FIG. 1 is a block diagram of a graphics system consistent with the improved clipping technique of this invention.

FIG. 1 is a block diagram of a graphics system consistent with the claimed invention. The graphics system includes graphics application 110, graphics engine 114, graphics controller nmd graphics buffer 116, and display 118.

Graphics engine 114 receives graphics commands from application 110, executes instructions corresponding to the commands, and writes bit-mapped information corresponding to the instructions to graphics controller 116. Graphics engine 114 implements a method, consistent with this invention, for writing clipped graphics to graphics controller 116 based on the graphics commands from application 110.

In particular, graphics engine 114 analyzes the relationships between a clipping rectangle and the graphics elements to be stored in graphics controller 116, and selectively writes information to graphics controller 116 in a manner that reduces clipping computation time. By reducing the clipping computation time, graphics engine 114 reduces processing overhead and is thus able to provide information to graphics controller 116 at a higher rate. The visual appearance of the graphics elements on display 118 is therefore enhanced.

Figure 2:
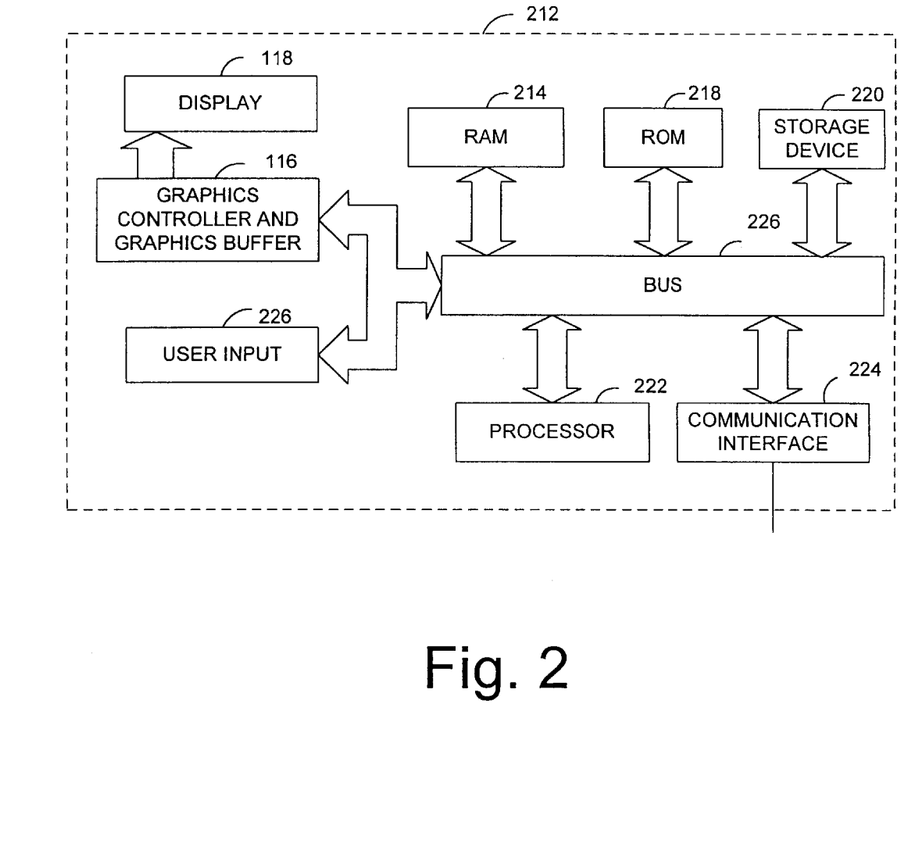
FIG. 2 is a block diagram of a computer system on which the apparatus and methods consistent with this invention may be implemented.

FIG. 2 is a block diagram of graphics system that may be used to implement the architecture in FIG. 1. Computer system 212 in FIG. 2 can be a general purpose computer system, such as a conventional personal computer or laptop computer, that includes random access memory (RAM) 214, read only memory ROM 218, storage device 220, processor 222, and communication interface 224, all interconnected by bus 226. Bus 226 also connects to user input 226 and graphics controller 116. Display 118 is connected to graphics controller 116. User input may be one or more user input devices, such as a keyboard, joystick, or mouse. Display 118 may be a CRT or other type of display device.

RAM 214 or a dynamic storage device stores instructions issued by application program 110 and graphics engine 114. These instructions are executed by processor 222. In one embodiment, graphics controller 116 may contain the line clipping algorithm of the present invention, so that processor 222 is not involved in calculating the clipping points.

ROM 218 is used for storing static information and instructions used by processor 222. Storage device 220, such as a magnetic or optical disk, also stores instructions and data used in the operation of computer system 212.

The system shown in FIG. 2 can be used to implement the clipping technique consistent with this invention. That technique may be implemented by computer system 212 using hardware, software, or a combination of hardware and software. For example, appropriate programs may reside in any one or more of RAM 214, ROM 218, or storage device 220, and processor 222 would then execute those programs.

Such programs may also be read into RAM 214 from another computer-readable medium, such as storage device 220. Execution of sequences of instructions contained in RAM 214 causes processor 222 to carry out apparatus and methods consistent with the present invention described herein.

Hard-wired circuitry may be used in place of or in combination with software instructions to implement the invention. Thus, implementations consistent with the invention are not limited to any specific combination of hardware circuitry and software.

The term "computer-readable medium" as used herein refers to any medium that participates in providing instructions to processor 222 for execution. Such a medium may take many forms, such as non-volatile memory media, volatile memory media, transmission media, as well as equivalents. Non-volatile memory media includes optical or magnetic disks, such as storage device 220. Volatile memory media includes RAM. Transmission media includes coaxial cables, copper wire and fiber optics, including the wires that comprise bus 226. Transmission media can also take the form of acoustic or light waves, such as those generated during radio wave and infrared data communications.

Common forms of computer-readable media include a floppy disk, a flexible disk, hard disk, magnetic tape, or any other magnetic storage medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read and use.

Various forms of computer readable media may be involved in carrying one or more sequences of instructions to processor 222 for execution. For example, the instructions may initially be carried on a magnetic disk or a remote computer. The remote computer can load the instructions into its dynamic memory and send the instructions over a telephone line using a modem. A modem local to computer system 212 can receive the data on the telephone line and use an infrared transmitter to convert the data to an infrared signal. An infrared detector coupled to appropriate circuitry can receive the data carried in the infrared signal and place the data on bus 226. Bus 226 carries the data to RAM 214, from which processor 222 retrieves and executes the instructions. Processor 222 may store the instructions received by RAM 214 on storage device 220 either before or after execution.

Computer system 212 also includes a communication interface 224 coupled to bus 226. Communication interface 224 provides two way communications to other systems. For example, communication interface 224 may be an ISDN card or a modem to provide a data communication connection to a corresponding type of telephone line. Communication may also be, for example, a LAN card to provide communication to a LAN. Communication interface 224 may also be a wireless card for implementing wireless communication between computer system 212 and wireless systems. In any such implementation, communication interface 224 sends and receives electrical, electromagnetic or optical signals that carry data streams representing various types of information.

The link between communication interface 224 and external devices and systems typically provides data communication through one or more networks or other devices. For example, the link may provide a connection to a local network (not shown) to a host computer or to data equipment operated by an Internet Service Provider (ISP). An ISP provides data communication services through the Internet. Local networks and the Internet both use electrical, electromagnetic or optical signals that carry digital data streams. The signals through the various networks and the signals between the networks and communication interface 224, which carry the digital data to and from computer system 212, are exemplary forms of carrier waves transporting the information.

Computer system 212 can send messages and receive data, including program code, through the network(s) via the link between communication interface 224 and the external systems and devices. In the Internet, for example, a server might transmit a requested code for an application program through the Internet, an ISP, a local network, and communication interface 224.

Program code received over the network may be executed by processor 222 as it is received, and/or stored in memory, such as in storage device 220, for later execution. In this manner, computer system 212 may obtain application code in the form of a carrier wave.

Figure 3:
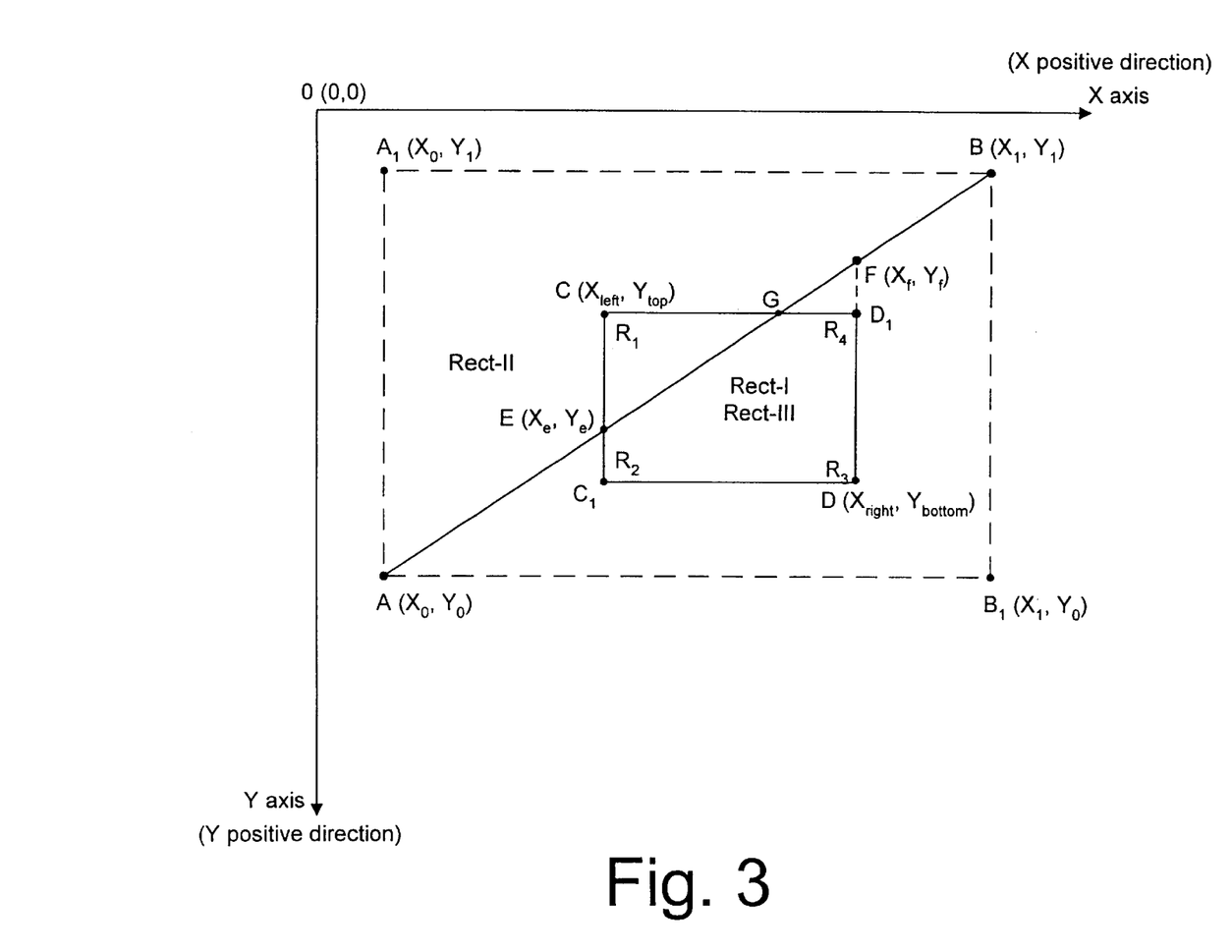
FIG. 3 is a block diagram illustrating an example of the clipping operations consistent with this invention.

FIG. 3 is a block diagram illustrating an example of the clipping operations performed by graphics engine 114 when writing line segment AB. Graphics engine 114 first determines whether there is an overlapping relationship between Rect-II having a line segment AB as a diagonal and clipping rectangle Rect-I ($CD_1DC_1$). Point C has coordinates $X_{left}$, $Y_{top}$, and point D has coordinate $X_{right}$, $Y_{bottom}$. If there is overlap, a clipping operation must be performed. If a clipping operation is necessary, then graphics engine 114 analyzes the relationship between Rect-II and clipping rectangle Rect-I, and performs a clipping algorithm. If there is no overlap, or if an efficient clipping algorithm can be performed, then valuable processing is saved.

The X, Y axes in FIG. 3 represent the coordinate system of display 118. The horizontal line across the top represents the X axis in a positive direction, and the vertical line along the left side represents the Y axis in a positive direction. The intersection of the X and Y axes in the upper left corner represents coordinate position 0, 0.

For purposes of determining the overlapping relationship between line segment AB and the clipping area Rect-I, graphics engine 114 designates the leftmost point of line segment AB as point A, and designates rightmost point of line segment AB as point B. Point A has coordinates $X_0, Y_0$, and point B has coordinates $X_1, Y_1$. Graphics engine 114 forms a logical rectangle, Rect-II, using line segment AB as the diagonal (shown in broken line in FIG. 3). The apparatus and method consistent with the improved clipping technique analyzes the relationship between clipping rectangle Rect-I and rectangle Rect-II to determine whether line segment AB overlaps clipping area $CD_1DC_1$. Graphics engine 114 performs a clipping algorithm depending on how the two rectangles overlap. To determine whether line segment AB and clipping rectangle Rect-I overlap, graphics engine 114 compares the relationship between a rectangle (Rect-II) having line segment AB as a diagonal, and clipping rectangle Rect-I. Comparing rectangles requires less processing overhead than conventional systems that perform a complex clipping algorithm each time a graphics element is written by graphics engine 114 to graphics controller 116.

Figure 4:
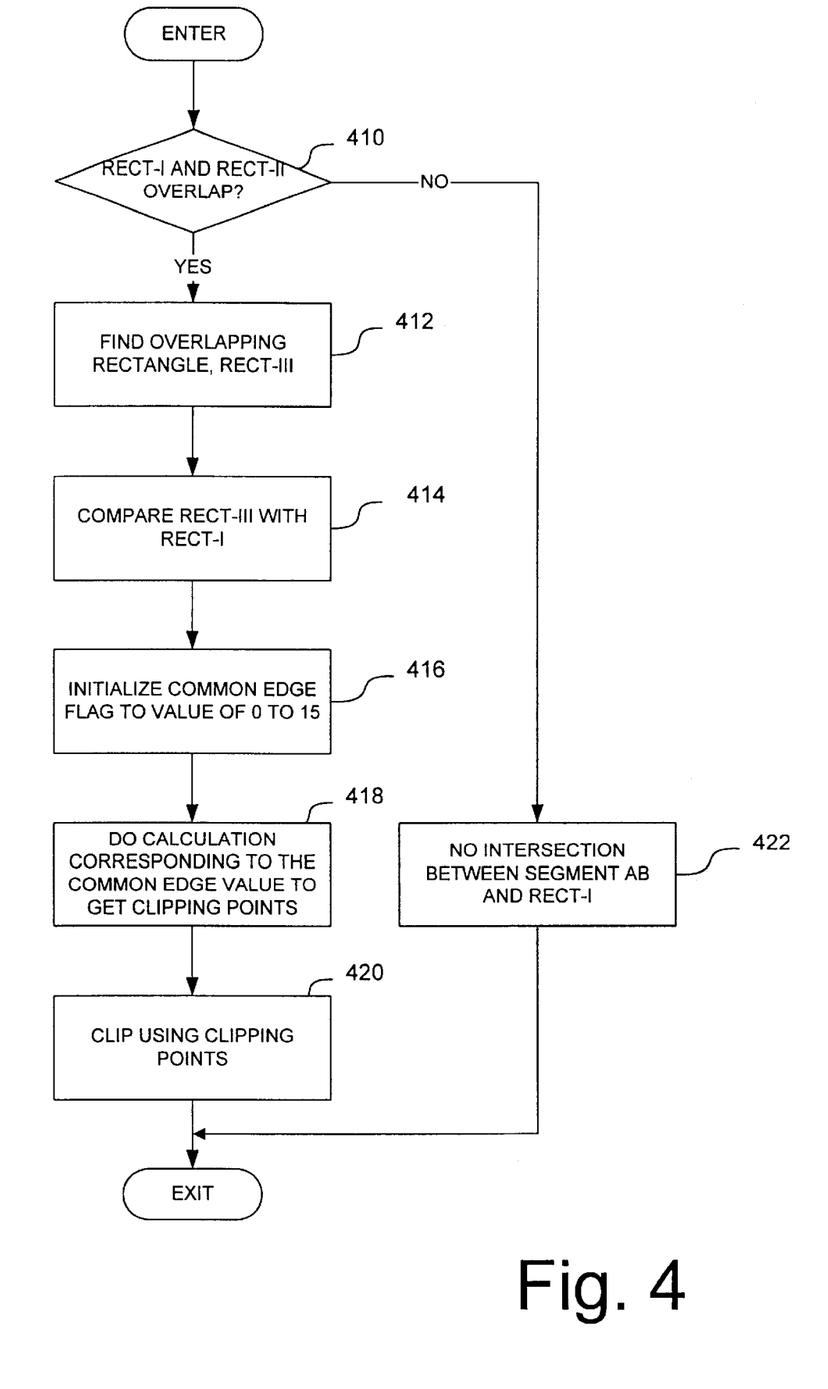
FIG. 4 is a flowchart illustrating the process performed by the graphics engine of FIG. 1.
Figure 5A:
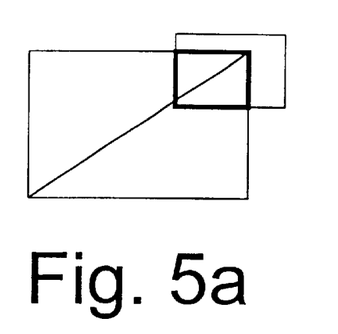
FIG. 5a, FIG. 5b, FIG. 5c, FIG. 5d, FIG. 5e, and FIG. 5f show examples of each of the possible ways in which a clipping rectangle can overlap a line segment.
Figure 5B:
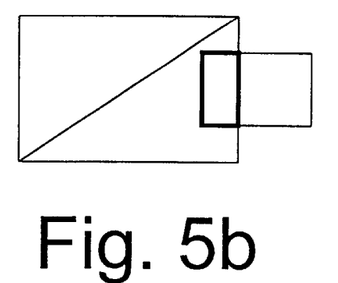
Figure 5C:
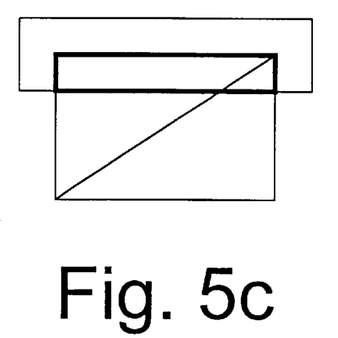
Figure 5D:
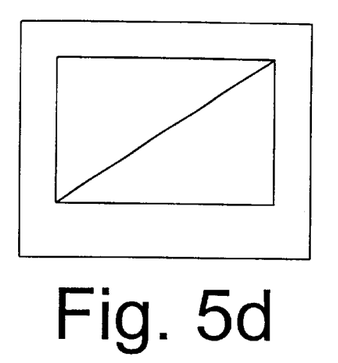
Figure 5E:
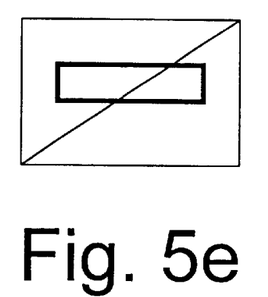
Figure 5F:
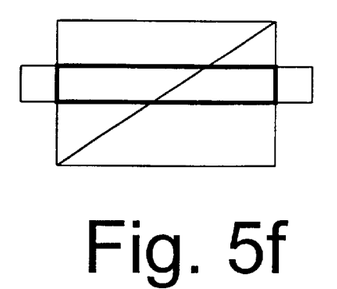

FIG. 4 is a flowchart illustrating the process performed by graphics engine 114 to carry out the improved clipping technique. To perform a clipping operation, graphics engine 114 determines the coordinates of the intersection points between line segment AB and clipping rectangle Rect-I. In FIG. 3, the points of intersection are E and G, but the intersections may be at other locations on the four sides of clipping rectangle Rect-I, or they may not exist at all. To determine the intersection points, graphics engine 114 determines whether Rect-I and Rect-II overlap (i.e., whether Rect-III exists or not) (step 410). If Rect-III does not exist, then line segment AB does not intersect Rect-I (step 422), and graphics engine 114 exits the process. Making an initial determination of whether Rect-III exists eliminates many unnecessary computations.

If there is overlap, graphics engine 114 then finds overlapping rectangle, Rect-III, which may have zero width, zero length, or both (step 412). Then, if line segment AB does intersect Rect-I, line segment AB must cross at least one of the common edges between Rect-I and Rect-III. Proceeding in this manner reduces the calculations to determining the intersection of line segment AB with the common edges between Rect-I and Rect-III. Rect-I and Rect-III may have 0, 1, 2, 3, or 4 common edges.

Graphics engine 114 next compares Rect-I and Rect-III (step 414) to find their common edges. A four-bit common edge flag is used to indicate each of the sixteen possible overlapping situations (step 416). For example, the top edge of Rect-I is compared to the top edge of Rect-III. If their Y coordinates are the same, then Rect-I and Rect-III have a common top edge. In that case, the bit which represents the top edge is set to 1. Then, the bottom edges, the left edges and the right edges are compared until all four bits are initialized. Based on the common edge flag, the intersection clipping points are determined (step 418), and the graphics element is clipped in accordance with the clipping points (step 420). For each of the sixteen overlapping situations, graphics engine 114 only performs calculations that are absolutely necessary to determine if clipping is necessary (step 418).

Thus, if Rect-III does not exist, there is no intersection between line segment AB and Rect-I, and graphics engine 114 does not need to perform calculations to find intersection points for clipping. If, however, line segment AB intersects Rect-III, line segment AB will cross Rect-III at one or two crossing points. For example, if there are two crossing points, one represents where line segment AB enters Rect-III and another where line segment AB exits Rect-III. If there is one crossing point, line segment AB crosses a vertex of Rect-III, or Rect-III has zero width or zero height.

FIG. 5a, FIG. 5b, FIG. 5c, FIG. 5d, FIG. 5e, and FIG. 5f show examples of each of the possible ways in which clipping rectangle Rect-I can overlap line segment AB rectangle Rect-II. In the figures, line segment AB rectangle Rect-II is shown having a diagonal line, clipping rectangle Rect-I is shown without a diagonal line, and overlapping rectangle Rect-III is shown in bold. This gives four variations of FIG. 5a, four variations of FIG. 5b, four variations of FIG. 5c, one variation of FIG. 5d (as shown), one variation of FIG. 5e (as shown), and two variations of FIG. 5f, for a total of sixteen possible overlapping relationships between clipping rectangle Rect-I and rectangle Rect-II, which form overlapping rectangle Rect-III (with the exception of the arrangement shown in FIG. 5d).

Figure 6:
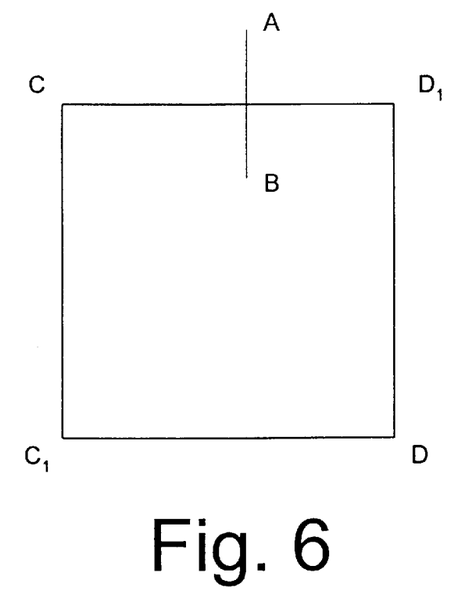
FIG. 6 illustrates a situation in which the overlapping rectangle has zero width.
Figure 7:
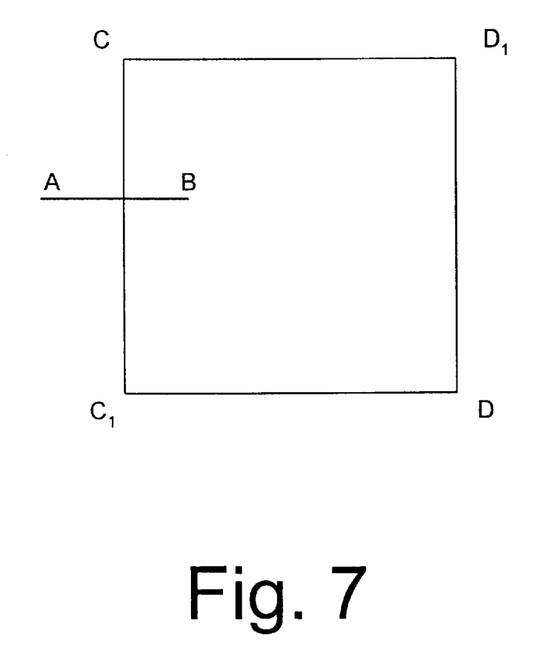
FIG. 7 illustrates a situation in which the overlapping rectangle has zero height.
Figure 8:
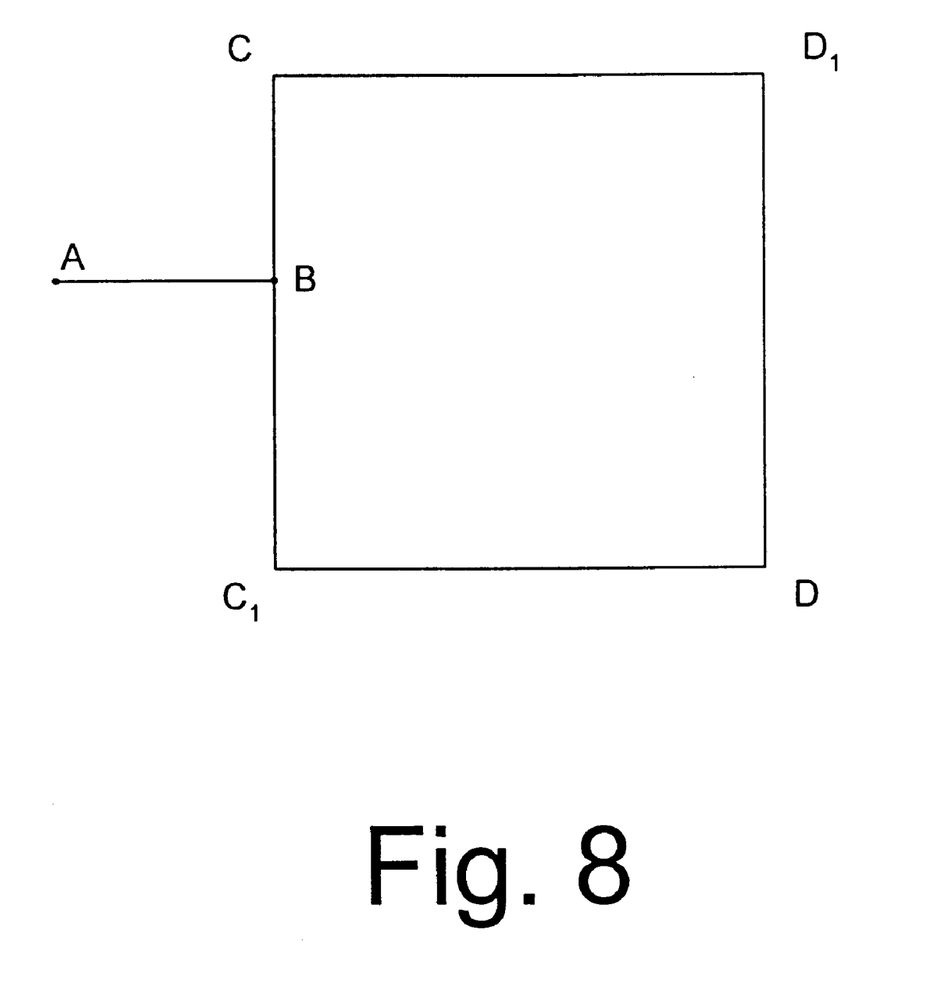
FIG. 8 illustrates a situation in which the overlapping rectangle has both zero width and zero height.

FIG. 6 illustrates the situation in which the overlapping rectangle defined by line segment AB has zero width. FIG. 7 illustrates the situation in which the overlapping rectangle defined by line segment AB has zero height. FIG. 8 illustrates the situation in which the overlapping rectangle defined by line segment AB is both zero width and zero height because only one end point of line segment AB touches clipping rectangle $CD_1DC_1$.

Because Rect-III represents the intersection of the clipping rectangle and the rectangle formed using line segment AB as a diagonal, each crossing point of line segment AB must be on a common edge between overlapping rectangle Rect-III and clipping rectangle Rect-I, because each crossing point must be on both line segment AB, which is within Rect-II and on the edges of clipping rectangle Rect-I. This relationship simplifies line clipping calculation to simply calculating the intersection points between line segment AB and each common edge, which significantly reduces the number of calculations compared to conventional methods.

Crossing points can be calculated by graphics engine 114 using any existing algorithms, such as Bresenham's run length slice algorithm, a basic incremental algorithm using slope, or a variety of other well-known algorithms. For purposes of illustration, the following equation is used to represent line segment AB: $(X-X_0)*(Y_1-Y_0)=(Y-Y_0)*(X_1-X_0)$. Graphics engine 114 can pre-process the values of $(Y_1-Y_0)$ and $(X_1-X_0)$. If line segment AB crosses a vertical edge of the clipping rectangle, then the X coordinate is known. Therefore, one integer division and one integer multiplication are needed to obtain the Y coordinate of this crossing point using the equation. If line segment AB crosses a horizontal edge of the clipping rectangle, then the Y coordinate is known. Therefore, one integer division and one integer multiplication are needed to get the X coordinate of this crossing point using the equation. If $(Y_1-Y_0)=0$, the line segment AB is horizontal. If $(X_1-X_0)=0$, the line segment AB is vertical.

The improved clipping technique reduces the average computation time compared to conventional line clipping techniques by eliminating or reducing clipping calculations. For example, if the common edge flag indicates that there is one common edge, only one computation is necessary; if the common edge flag indicates that there are two common edges, only one or two computations are necessary; if the common edge flag indicates that there are three common edges, at most three computations are necessary; and if the common edge flag indicates that there are four common edges, at most four computations are necessary. When there are three or fewer common edges, systems and methods consistent with this invention require fewer computations than conventional techniques, which require four computations for each clipping operation. Thus, for example, systems and methods consistent with this invention reduce computation time when the clipping rectangle is small and the chances of a line crossing the clipping rectangle is low; the clipping rectangle is large and the chances of either one or both end points of a line segment being inside the rectangle are high; or line segment AB is either horizontal or vertical.

In the worst case, four calculations will be needed to determine the intersection points between line segment AB and clipping rectangle Rect-I (see, e.g., FIG. 11), but this occurs only if the following conditions are met simultaneously: (1) there are four common edges between overlapping rectangle Rect-III, and clipping rectangle Rect-I; and (2) after two calculations (i.e., line segment AB and line $CC_1$ extend to point E; line segment AB and line $D_1D$ extend to point F), neither E nor F are on edges of Rect-I. Under these conditions, graphics engine 114 must calculate whether $CD_1$ crosses line segment AB. If point G is between point C and $D_1$, then graphics engine 114 will perform a fourth calculation to determine whether line segment $C_1D$ crosses line segment AB. If point G is not between point C and $D_1$, there will be no intersection between line segment AB and Rect-I. Therefore, a fourth calculation is not necessary.

Figure 9:
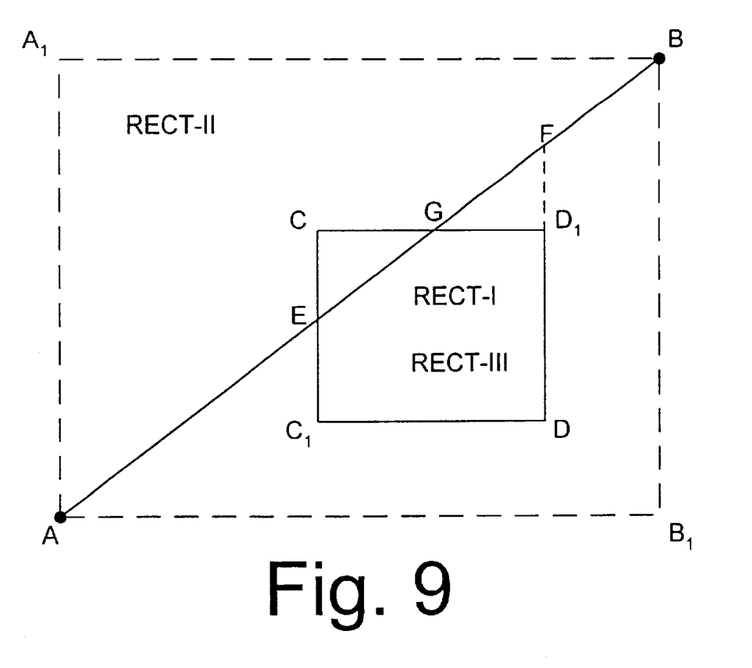
FIG. 9 illustrates one situation where there are four common edges between an overlapping rectangle and a clipping rectangle.

FIG. 9 illustrates a situation where there are four common edges between overlapping rectangle Rect-III and clipping Rect-I. This situation requires three calculations. First, graphics engine 114 calculates intersection E between line segment AB and $CC_1$. Because E is between C and $C_1$, E is a clipping point. Second, graphics engine 114 calculates intersection F between AB and $D_1D$. Since F is not between $D_1$ and $D_1$, F is not a clipping point. Third, graphics engines 114 determines that the second clipping point must be on one of the two horizontal edges, where the Y coordinate of the edge is between the Y coordinate of point E and the Y coordinate of point F. Graphics engine 114 then calculates the clipping point G between AB and $CD_1$.

Figure 10:
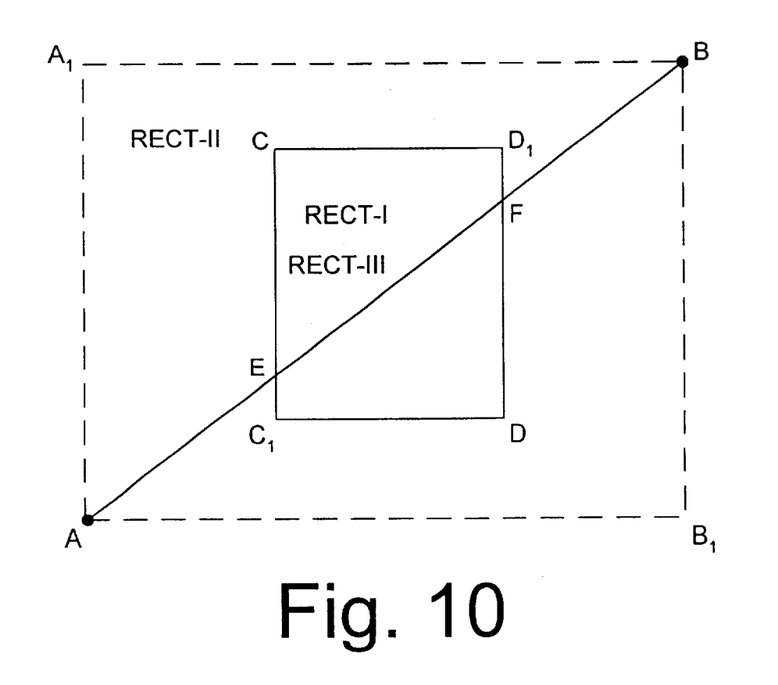
FIG. 10 illustrates another situation in which there are four common edges between an overlapping rectangle and a clipping rectangle.

FIG. 10 illustrates a second situation in which there are four common edges between overlapping rectangle Rect-III and clipping rectangle Rect-I. In FIG. 10, line segment AB intersects the two vertical sides of overlapping rectangle Rect-III. Therefore, the calculations steps are similar to FIG. 9, except that only two calculations are needed. Points E and F are both clipping points.

Figure 11:
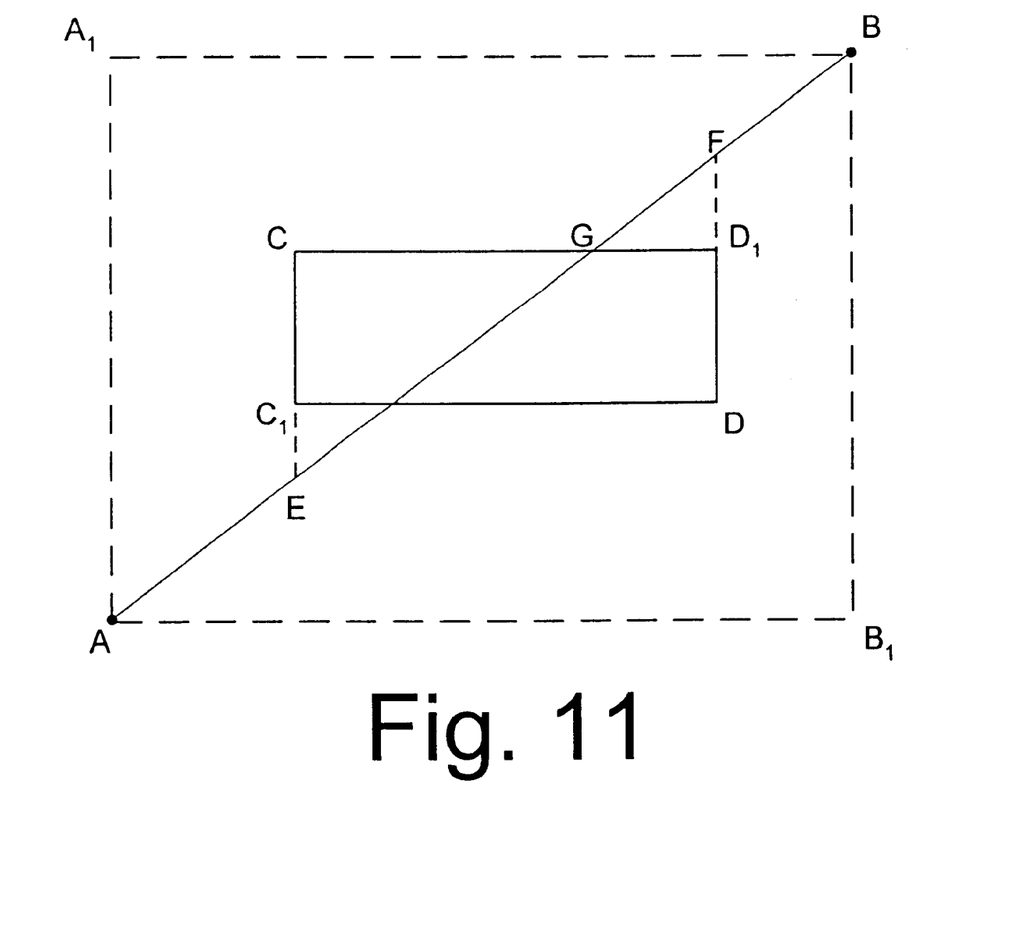
FIG. 11 illustrates yet another situation in which there are four common edges between an overlapping rectangle and a clipping rectangle.

FIG. 11 illustrates a third situation in which there are four common edges between overlapping rectangle Rect-III and clipping rectangle Rect-I. Again, the calculation steps are similar to FIG. 9, except that four calculations are needed. Line segment AB intersects Rect-III on horizontal lines $CD_1$, and $C_1D$. Neither point E nor point F is a clipping point.

Figure 12:
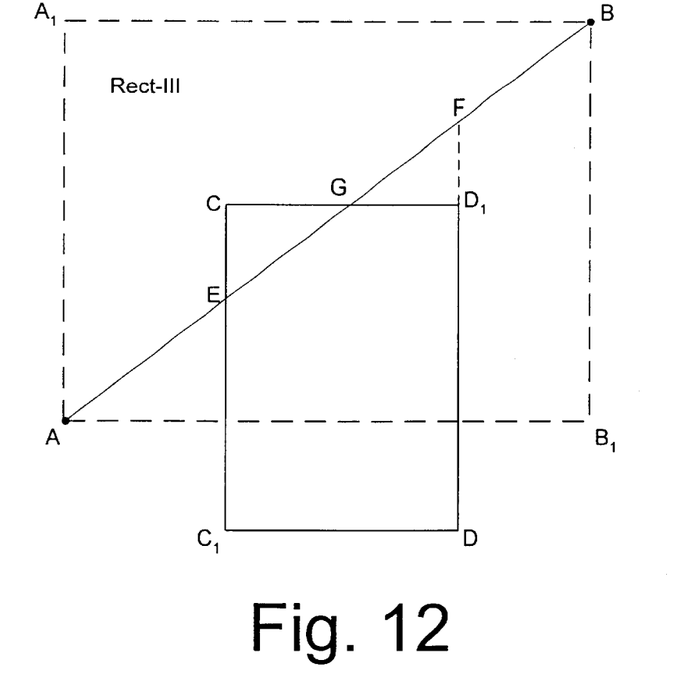
FIG. 12 illustrates one situation in which there are three common edges between an overlapping rectangle and a clipping rectangle.

FIG. 12 illustrates a situation where there are three common edges between overlapping rectangle Rect-III and clipping rectangle Rect-I. In this situation, graphics engine 114 calculates point E, point F, and G in a manner similar to the calculations of FIG. 9.

Figure 13:
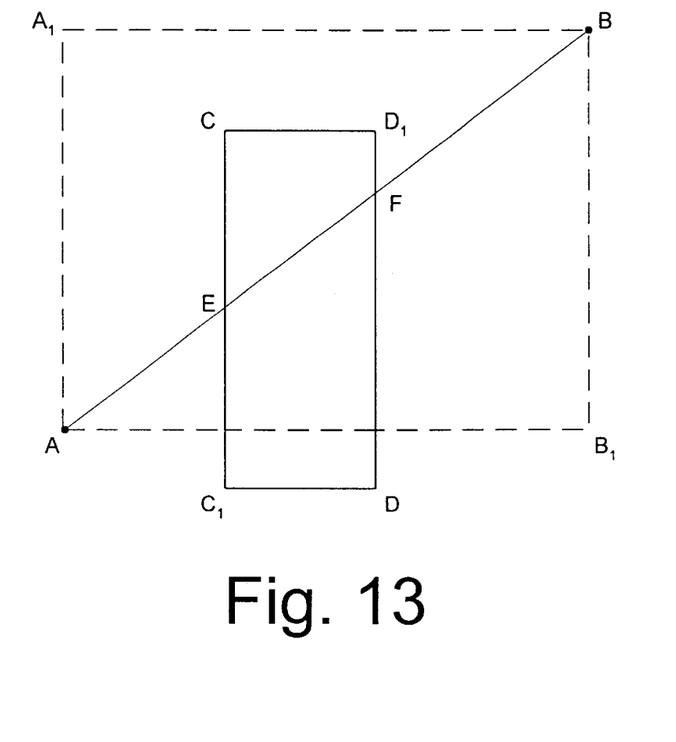
FIG. 13 illustrates another situation in which there are three common edges between en overlapping rectangle and a clipping rectangle.

FIG. 13 illustrates a second situation in which there are three common edges between overlapping rectangle Rect-III and clipping rectangle Rect-I. In this situation, similar to FIG. 10, only two calculations are needed to calculate point E and point F.

If there are two common edges between overlapping rectangle Rect-III and clipping rectangle Rect-I, graphics engine 114 will at most perform two calculations. If line segment AB does not intersect with the first common edge, then there is no intersection between line segment AB and clipping rectangle Rect-I.

Figure 14:
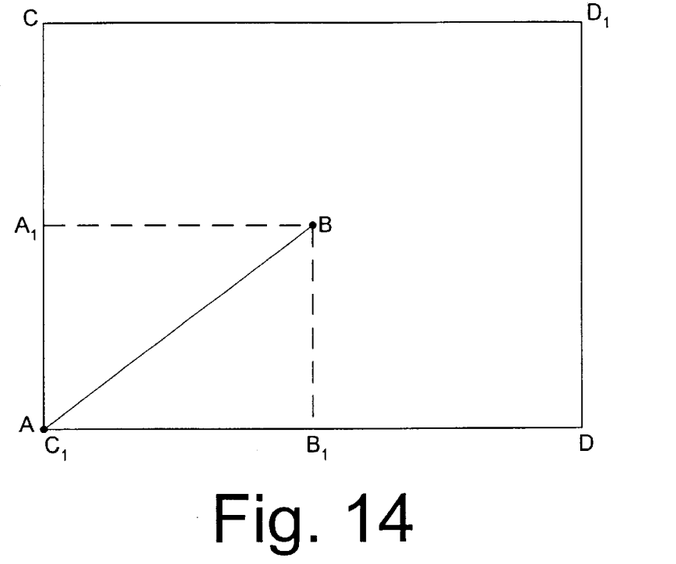
FIG. 14 illustrates one situation in which there are two common edges between an overlapping rectangle and a clipping rectangle.

FIG. 14 illustrates a situation where there are two common edges between overlapping rectangle Rect-III and clipping rectangle Rect-I. In this situation, graphics engine 114 only performs one calculation to determine clipping point A.

Figure 15:
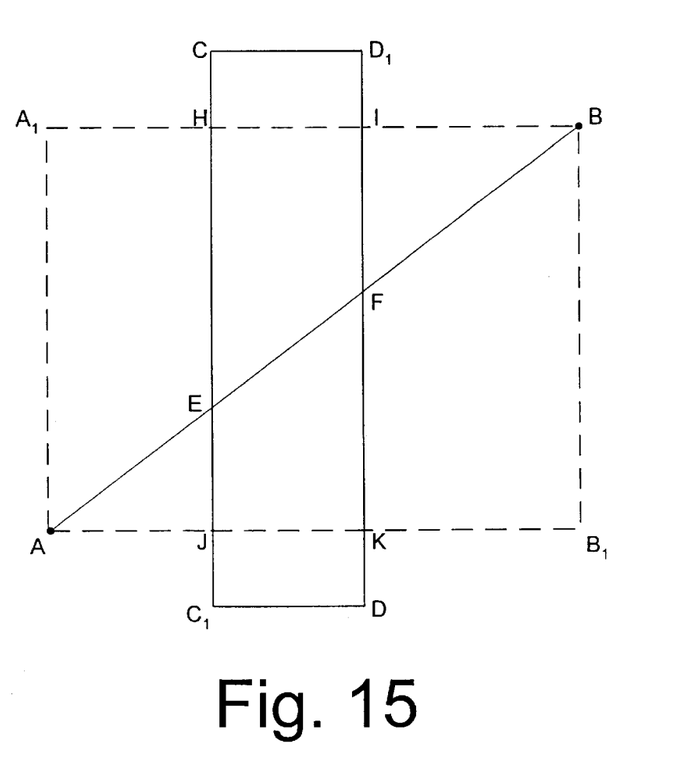
FIG. 15 illustrates another situation in which there are two common edges between an overlapping rectangle and a clipping rectangle.

FIG. 15 is a second example of two common edges between overlapping rectangle Rect-III and clipping rectangle Rect-I. In this situation, graphics engine 114 performs two calculations to get clipping point E and clipping point F.

If there is only a single common edge between overlapping rectangle Rect-III and clipping rectangle Rect-I, there will be at most one crossing point between line segment AB and clipping rectangle Rect-I. Graphics engine 114 will need only to perform one calculation to get the possible intersection between line segment AB and the common edge between Rect-III and Rect-I.

Figure 16:
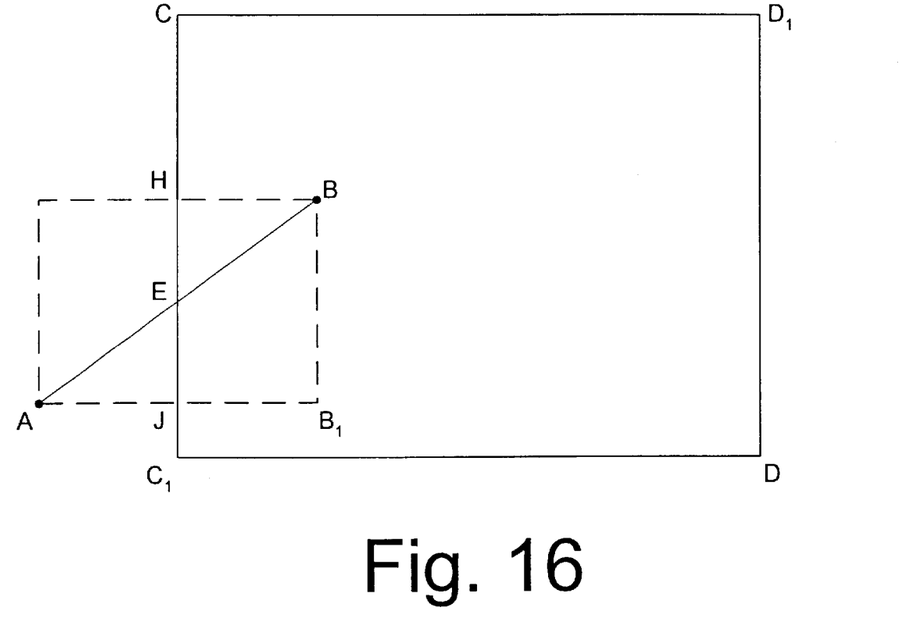
FIG. 16 illustrates a situation in which there is a single common edge between an overlapping rectangle and a clipping rectangle.

FIG. 16 illustrates the situation where there is a single common edge between overlapping rectangle Rect-III and clipping rectangle Rect-I. Graphics engine 114 performs a single calculation to determine the intersection between line segment AB and line HJ to get clipping point E.

Figure 17:
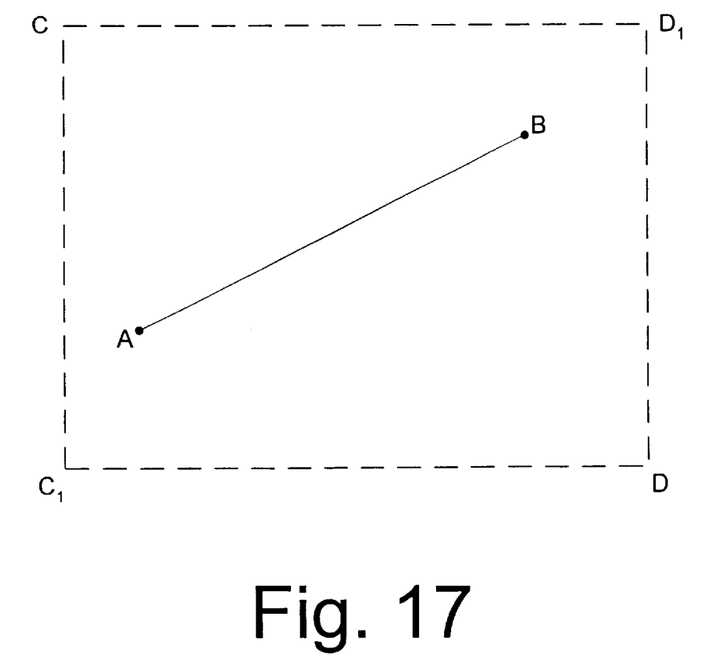
FIG. 17 illustrates a situation in which a line segment is completely inside a clipping rectangle.

FIG. 17 illustrates the situation in which the line segment is completely inside clipping rectangle Rect-I. If there is no common edge between Rect-III and Rect-I, there is no crossing point. Therefore, line segment AB is completely inside clipping rectangle Rect-I, so there is no common edge between overlapping rectangle Rect-III and clipping rectangle Rect-I and no calculation is needed.

V. CONCLUSION

It will be apparent to those skilled in the art that various modifications and variations can be made in the improved clipping technique without departing from the scope or spirit of the invention. For example, the improved clipping technique can be used in a system other than the system of FIG. 1 that needs clipping. The apparatus and method may be embodied entirely in hardware, entirely in software, or in a combination of hardware and software. If the apparatus or method consistent with the improved clipping technique is embodied in whole or in part in software, then the software can be embodied on any computer-readable or useable medium, such as a memory, a disk, or a signal on a line.

Other embodiments of the invention will be apparent to those skilled in the art from consideration of the specification and practice of the disclosed embodiments. The specification and examples are exemplary only, and the true scope and spirit of the invention is defined by the following claims and their equivalents.

What is claimed is:

1. Apparatus for clipping a graphics element, comprising:
   means for comparing a logical rectangle formed based on the graphics element with a rectangle defining a graphics area to determine whether the graphics element and the graphics area overlap;
   means for determining the need for a clipping operation according to the determination whether the logical rectangle and graphics area rectangle overlap;
   means for categorizing the overlap between the logical rectangle and the graphics area rectangle if there is a need for clipping, the categorizing including finding an overlapping region, determining each common edge of the graphics area rectangle and the overlapping region, and determining intersection clipping points between the graphics element and the graphics area based on the common edge determination; and
   means for clipping the graphics element based on the categorization of the overlap.

2. The apparatus according to claim 1, wherein the graphics element comprises a line, and the logical rectangle is formed using the line as a diagonal.

3. The apparatus according to claim 1, wherein the means for categorizing comprises:
   means for selecting which one of several categories corresponds to the overlap between the graphics element and the graphics area.

4. The apparatus according to claim 3, wherein the means for clipping comprises:
   means for performing a clipping operation corresponding to the category selected.

5. A method for clipping a graphics element, comprising:
   comparing a logical rectangle formed based on the graphics element with a rectangle defining graphics area to determine whether the graphics element and the graphics area overlap;
   determining the need for a clipping operation according to the determination whether the logical rectangle and graphics area rectangle overlap;
   categorizing the overlap between the logical rectangle and the graphics area rectangle if there is a need for clipping, the categorizing including finding an overlapping region, determining each common edge of the graphics area rectangle and the overlapping region, and determining intersection clipping points between the graphics element and the graphics area based on the common edge determination; and
   clipping the graphics element based on the categorization of the overlap.

6. The method according to claim 5, wherein the graphics element comprises a line, and the logical rectangle is formed using the line as a diagonal.

7. The method according to claim 5, wherein the step of categorizing includes:
   selecting which one of several categories corresponds to the overlap between the graphics element and the graphics area.

8. The method according to claim 7, wherein the step of clipping includes:
   performing a clipping operation corresponding to the category selected.

9. A system for performing clipping of a graphics element, comprising:
   means for providing a first graphics command requesting that a graphics element be written to a display device, and for providing a second graphics command requesting that a graphics area be written to the display device;
   means for comparing a logical rectangle formed based on the graphics element with rectangle defining the graphics area to determine whether the graphics element and graphics area overlap;
   means for determining the need for a clipping operation according to the determination whether the logical rectangle and graphics area rectangle overlap;
   means for categorizing the overlap between the logical rectangle and the graphics area rectangle if there is a need for clipping the categorizing including finding an overlapping region, determining each common edge of the graphics area rectangle and the overlapping region, and determining intersection clipping points between the graphics element and the graphics area based on the common edge determination; and
   means for clipping the graphics element based on the categorization of the overlap.

10. The system according to claim 9, wherein the graphics element comprises a line, and the logical rectangle is formed using the line as a diagonal.

11. The system according to claim 9, wherein the means for categorizing comprises:
    means for selecting which one of several categories corresponds to the overlap between the graphics element and the graphics area.

12. The system according to claim 11, wherein the means for clipping comprises:
    means for performing a clipping operation corresponding to the category selected.

13. A computer-readable medium containing instructions to perform a method for clipping a graphics element, the method comprising:
    comparing a logical rectangle formed based on the graphics element with a rectangle defining a graphics area to determine whether the graphics element and the graphics area overlap;
    determining the need for a clipping operation according to the determination whether the logical rectangle and graphics area rectangle overlap;
    categorizing the overlap between the logical rectangle and the graphics area rectangle if there is a need for clipping, the categorizing including finding an overlapping region, determining each common edge of the graphics area rectangle and the overlapping region, and determining intersection clipping points between the graphics element and the graphics area based on the common edge determination; and
    clipping the graphics element based on the categorization of the overlap.

14. The computer-readable medium according to claim 13, wherein the graphics element comprises a line, and the logical rectangle is formed using the line as a diagonal.

15. The computer-readable medium according to claim 13, wherein the step of categorizing includes:
    selecting which one of several categories corresponds to the overlap between the graphics element and the graphics area.

16. The computer-readable medium according to claim 15, wherein the method further includes:
    performing a clipping operation corresponding to the category selected.

17. Apparatus for clipping a graphics element, comprising:

a comparator for comparing a logical rectangle formed based on the graphics element with a rectangle defining a graphics area to determine whether the graphics element and the graphics area overlap;

a determiner for determining the need for a clipping operation according to the determination whether the logical rectangle and graphics area rectangle overlap;

a categorizer for categorizing the overlap between the logical rectangle and the graphics area rectangle if there is a need for clipping, the categorizing including finding an overlapping region, determining each common edge of the graphics area rectangle and the overlapping region, and determining intersection clipping points between the graphics element and the graphics area based on the common edge determination; and a clipper for clipping the graphics element based on the categorization of the overlap.

18. The apparatus according to claim 17, wherein the graphics element comprises a lines, and the logical rectangle is formed using the line as a diagonal.

19. The apparatus according to claim 17, wherein the categorizer comprises:

a selector for selecting which one of several categories corresponds to the overlap between the graphics element and the graphics area.

20. The apparatus according to claim 19, wherein the clipper comprises:

a category clipper for performing a clipping operation corresponding to the category selected.

21. A signal containing instructions to perform a method for clipping a graphics element, the method comprising:

comparing a logical rectangle formed based on the graphics element with a rectangle defining a graphics area to determine whether the graphics element and the graphics area overlap;

determining the need for a clipping operation according to the determination whether the logical rectangle and graphics area rectangle overlap;

categorizing the overlap between the logical rectangle and the graphics area rectangle if there is a need for clipping, the categorizing including finding an overlapping region, determining each common edge of the graphics area rectangle and the overlapping region, and determining intersection clipping points between the graphics element and the graphics area based on the common edge determination; and clipping the graphics element based on the categorization of the overlap.

22. The signal according to claim 21, wherein the graphics element comprises a line, and the logical rectangle is formed using the line as a diagonal.

23. The signal according to claim 21, wherein the step of categorizing includes:

selecting which one of several categories corresponds to the overlap between the graphics element and the graphics area.

24. The signal according to claim 23, wherein the method further includes:

performing a clipping operation corresponding to the category selected.

* * * * *

UNITED STATES PATENT AND TRADEMARK OFFICE
CERTIFICATE OF CORRECTION

PATENT NO.    : 6,271,862 B1                                      Page 1 of 1
DATED         : August 7, 2001
INVENTOR(S)   : Cindy Yu It is certified that error appears in the above-identified patent and that said Letters Patent is hereby corrected as shown below:

Column 10, claim 9,
Line 12, after "clipping" insert -- , --.

Column 11, claim 18,
Line 19, change "lines" to -- line --.

Signed and Sealed this

Sixteenth Day of April, 2002

Attest:

JAMES E. ROGAN
Attesting Officer        Director of the United States Patent and Trademark Office